United States Patent
Melkote et al.

(10) Patent No.: US 7,298,574 B1
(45) Date of Patent: Nov. 20, 2007

(54) SERVO WRITING A DISK DRIVE USING CORRECTION VALUES THAT ATTENUATE PHASE ERROR PROPAGATION

(75) Inventors: Hemant Melkote, San Jose, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 7 days.

(21) Appl. No.: 11/431,303

(22) Filed: May 10, 2006

(51) Int. Cl.
- G11B 21/02 (2006.01)
- G11B 5/58 (2006.01)
- G11B 5/596 (2006.01)
- G11B 15/12 (2006.01)

(52) U.S. Cl. .................. 360/75; 360/77.01; 360/78.04
(58) Field of Classification Search ............. None
See application file for complete search history.

(56) References Cited

U.S. PATENT DOCUMENTS

| | | | |
|---|---|---|---|
| 5,576,906 | A | 11/1996 | Fisher et al. |
| 5,668,679 | A | 9/1997 | Swearingen et al. |
| 5,696,639 | A | 12/1997 | Spurbeck et al. |
| 5,754,352 | A | 5/1998 | Behrens et al. |
| 5,901,003 | A | 5/1999 | Chainer et al. |
| 5,991,115 | A | 11/1999 | Chainer et al. |
| 6,069,499 | A | 5/2000 | Cho et al. |
| 6,075,668 | A | 6/2000 | Chainer et al. |
| 6,078,450 | A | 6/2000 | Chainer et al. |
| 6,091,564 | A | 7/2000 | Codilian et al. |
| 6,101,055 | A | 8/2000 | Chainer et al. |
| 6,191,906 | B1 | 2/2001 | Buch |
| 6,249,395 | B1 | 6/2001 | Conway |
| 6,252,732 | B1 | 6/2001 | Chainer et al. |
| 6,259,574 | B1 | 7/2001 | Chainer et al. |
| 6,292,318 | B1 | 9/2001 | Hayashi |

(Continued)

FOREIGN PATENT DOCUMENTS

EP 00199628 B1 7/1989

(Continued)

OTHER PUBLICATIONS

U.S. Appl. No. 09/993,778 entitled "Servo Circuit Having a Synchronous Servo Channel and Method for Synchronously Recovering Servo Data".

(Continued)

*Primary Examiner*—William Korzuch
*Assistant Examiner*—Jason Olson
(74) *Attorney, Agent, or Firm*—Howard H. Sheerin, Esq.

(57) ABSTRACT

Servo writing a disk of a disk drive is disclosed. A phase locked loop (PLL) is synchronized to first sectors previously written on a first track, and second sectors are written to a second track using the PLL, wherein a plurality of phase errors corresponding to the second sectors are saved. A correction value is computed corresponding to a selected one of the second sectors, wherein the correction value is computed in response to a plurality of the phase errors generated for a plurality of the second sectors leading the selected sector. The PLL is synchronized to the second sectors using the correction value, a third sector is written to a third track using the PLL, and a phase error is saved corresponding to the third sector.

12 Claims, 4 Drawing Sheets

U.S. PATENT DOCUMENTS

| | | |
|---|---|---|
| 6,304,407 B1 | 10/2001 | Baker et al. |
| 6,307,697 B1 | 10/2001 | Chainer et al. |
| 6,324,027 B1 | 11/2001 | Chainer et al. |
| 6,366,225 B1 | 4/2002 | Ozdemir |
| 6,411,453 B1 | 6/2002 | Chainer et al. |
| 6,429,989 B1 | 8/2002 | Schultz et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,704,156 B1 | 3/2004 | Baker et al. |
| 6,710,951 B1 * | 3/2004 | Cloke .................... 360/29 |
| 6,735,031 B2 | 5/2004 | Chainer et al. |
| 6,738,205 B1 | 5/2004 | Moran et al. |
| 6,771,443 B2 * | 8/2004 | Szita et al. .................... 360/51 |
| 6,785,075 B2 | 8/2004 | Bryant et al. |
| 6,898,035 B1 | 5/2005 | Chainer et al. |
| 6,924,960 B1 | 8/2005 | Melkote et al. |
| 6,943,978 B1 | 9/2005 | Lee |
| 6,987,639 B1 | 1/2006 | Yu |
| 7,199,959 B1 * | 4/2007 | Bryant ........................ 360/51 |
| 2002/0101672 A1 | 8/2002 | Chainer et al. |
| 2002/0145817 A1 | 10/2002 | Szita et al. |
| 2003/0048562 A1 | 3/2003 | Heydari et al. |
| 2005/0105200 A1 | 5/2005 | Chainer et al. |

FOREIGN PATENT DOCUMENTS

| | | |
|---|---|---|
| EP | 00721184 B1 | 2/2002 |

OTHER PUBLICATIONS

U.S. Appl. No. 10/875,591 entitled "Servo Writing a Disk Drive by Writing Multi-Bit Sync Marks in Spiral Tracks for Improved Servo Writing".

U.S. Appl. No. 10/911,039 entitled "Servo Writing a Disk Drive by Synchronizing a Servo Write Clock to a Reference Pattern on the Disk and Compensating for Repeatable Phase Error".

* cited by examiner

SERVO WRITING A DISK DRIVE USING CORRECTION VALUES THAT ATTENUATE PHASE ERROR PROPAGATION

BACKGROUND OF THE INVENTION

1. Field of the Invention

The present invention relates to disk drives. More particularly, the present invention relates to servo writing a disk drive using correction values that compensate for phase errors.

2. Description of the Prior Art

Disk drives for computer systems comprise a disk for storing data and a head actuated radially over the disk for writing data to and reading data from the disk. To effectuate the radial positioning of the head over the disk, the head is connected to the distal end of an actuator arm which is rotated about a pivot by a rotary actuator (e.g., a voice coil motor (VCM)). The disk is typically divided into a number of concentric, radially spaced tracks, where each track is divided into a number of data sectors. The disk is typically accessed a data sector at a time by positioning the head over the track which comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target track, and then maintaining centerline "tracking" while data is written to or read from the disk. A closed loop servo system typically performs the seeking and tracking operations by controlling the rotary actuator in response to position information generated from the head.

Figure 1:
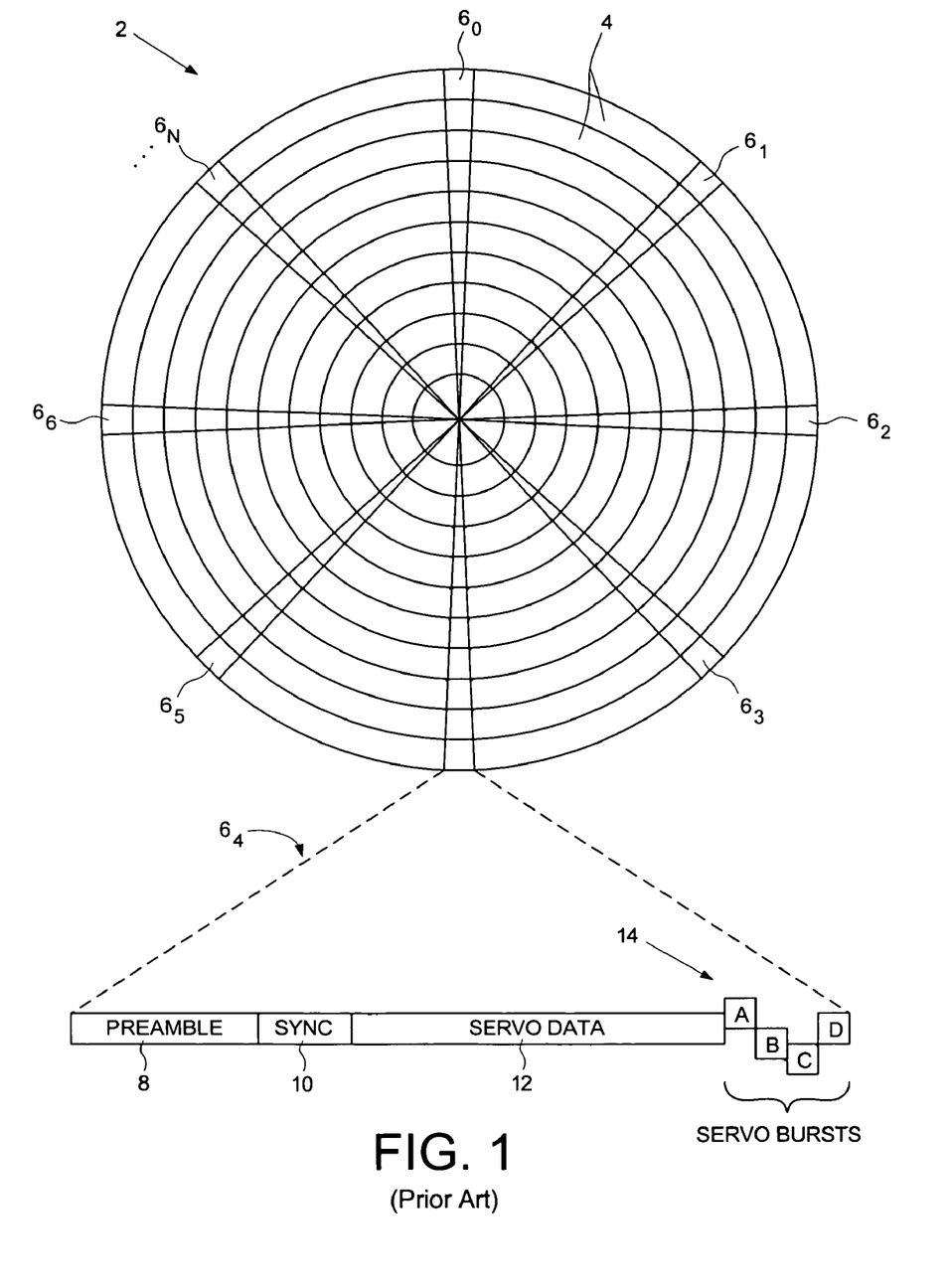
FIG. 1 shows a prior art disk format comprising a plurality of radially spaced, concentric servo tracks defined by a plurality of embedded servo sectors.

A well known technique for generating the head position control information is to record servo information in servo sectors disbursed circumferentially about the disk, "embedded" with the data sectors. This is illustrated in FIG. 1 which shows a disk 2 comprising a number of concentric tracks 4 and a number of embedded servo sectors $6_0$-$6_N$. Each servo sector 61 comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target track. The track addresses are recorded using a phase coherent Gray code so that the track addresses can be accurately detected when the head is flying between tracks. The servo bursts 14 in the servo sectors 6 comprise groups of consecutive transitions (e.g., A, B, C and D bursts) which are recorded at precise intervals and offsets with respect to the track centerline. Fine head position control information is derived from the servo bursts 14 for use in centerline tracking while writing data to and reading data from the target track.

The embedded servo sectors 6 are written to the disk 2 as part of the manufacturing process. Conventionally, an external servo writer has been employed which writes the embedded servo sectors 6 to the disks by processing each head disk assembly (HDA) in an assembly line fashion. The external servo writers employ very precise head positioning mechanics, such as a laser interferometer, for positioning the head at precise radial locations with respect to previously servo-written tracks so as to achieve very high track densities. A clock track is written at the outer diameter of the disk, and a clock head inserted into the HDA to read the clock track in order to synchronize a phase locked loop (PLL) used to write the servo sectors at the appropriate circumferential location (so that the servo sectors are aligned radially across the disk as in FIG. 1). However, external servo writers are expensive and present a significant bottle neck to the manufacturing process. In addition, inserting a clock head into the HDA requires the servo writing process take place in a clean room environment to prevent particulate contamination.

Certain "self-servo writing" techniques have been disclosed wherein components internal to the disk drive are employed to perform the servo writing process which avoids the drawbacks of external servo writers including the need for a clean room since self servo writing occurs within the sealed HDA. One technique for self servo writing propagates sectors (servo sectors and optional timing sectors) from a reference track (e.g., written at the outer diameter) across the disk radius (e.g., toward the inner diameter). While servoing on the reference track, a PLL is synchronized to the sectors written on the reference track which is used to propagate the sectors to an adjacent track. The read element of the head is then placed over the adjacent track and the write element over the next track, the PLL synchronized to the sectors previously written on the adjacent track, and the sectors propagated to the next track. This process is repeated until the sectors are propagated across the entire disk surface. A problem with this propagation technique is that certain components of the phase error (e.g., spindle harmonics, suspension vibration, sensor noise, etc.) are amplified due to the peaking nature of the PLL transfer function. These components of the phase error will propagate from track-to-track and grow unboundedly resulting in "wandering" servo sectors across the disk surface (not radially aligned as in FIG. 1).

There is, therefore, a need to attenuate phase error propagation when self servo writing a disk drive by propagating sectors.

SUMMARY OF THE INVENTION

An embodiment of the present invention comprises a method of servo writing a disk of a disk drive, wherein the disk drive comprises the disk and a head actuated over the disk, and the head comprises a read element and a write element. The read element is positioned over a first track on the disk and the write element is positioned over a second track on the disk. A phase locked loop (PLL) is synchronized to first sectors previously written on the first track, and second sectors are written to the second track using the PLL, wherein a plurality of phase errors corresponding to the second sectors are saved. A correction value is computed corresponding to a selected one of the second sectors, wherein the correction value is computed in response to a plurality of the phase errors generated for a plurality of the second sectors leading the selected sector. The read element is positioned over the second track on the disk and the write element over a third track on the disk, the PLL is synchronized to the second sectors using the correction value, a third sector is written to the third track using the PLL, and a phase error is saved corresponding to the third sector.

In one embodiment, the correction value is at least partially computed according to:

$$\alpha \Box e(t+m)$$

where α is a constant and e(t+m) is the phase error generated for one of the second sectors leading the selected sector by m sectors. In one embodiment, the correction value is at least partially computed according to:

$$\alpha_0 \cdot e(t) + \alpha_1 \cdot e(t+1) + \ldots \alpha_N \cdot e(t+N)$$

where $\alpha - \alpha_N$ are a plurality of constants selected to stabilize the PLL while attenuating phase error propagation from track-to-track.

Another embodiment of the present invention comprises a disk drive including a disk and a head actuated over the disk, wherein the head comprises a read element and a write element. The read element is positioned over a first track on the disk and the write element is positioned over a second track on the disk. A phase locked loop (PLL) is synchronized to first sectors previously written on the first track, and second sectors are written to the second track using the PLL, wherein a plurality of phase errors corresponding to the second sectors are saved. A correction value is computed corresponding to a selected one of the second sectors, wherein the correction value is computed in response to a plurality of the phase errors generated for a plurality of the second sectors leading the selected sector. The read element is positioned over the second track on the disk and the write element over a third track on the disk, the PLL is synchronized to the second sectors using the correction value, a third sector is written to the third track using the PLL, and a phase error is saved corresponding to the third sector.

Another embodiment of the present invention comprises control circuitry for servo writing a disk drive, the disk drive including a disk and a head actuated over the disk, wherein the head comprises a read element and a write element. The read element is positioned over a first track on the disk and the write element is positioned over a second track on the disk. A phase locked loop (PLL) is synchronized to first sectors previously written on the first track, and second sectors are written to the second track using the PLL, wherein a plurality of phase errors corresponding to the second sectors are saved. A correction value is computed corresponding to a selected one of the second sectors, wherein the correction value is computed in response to a plurality of the phase errors generated for a plurality of the second sectors leading the selected sector. The read element is positioned over the second track on the disk and the write element over a third track on the disk, the PLL is synchronized to the second sectors using the correction value, a third sector is written to the third track using the PLL, and a phase error is saved corresponding to the third sector.

DESCRIPTION OF THE PREFERRED EMBODIMENTS

Figures 2A, 2B:
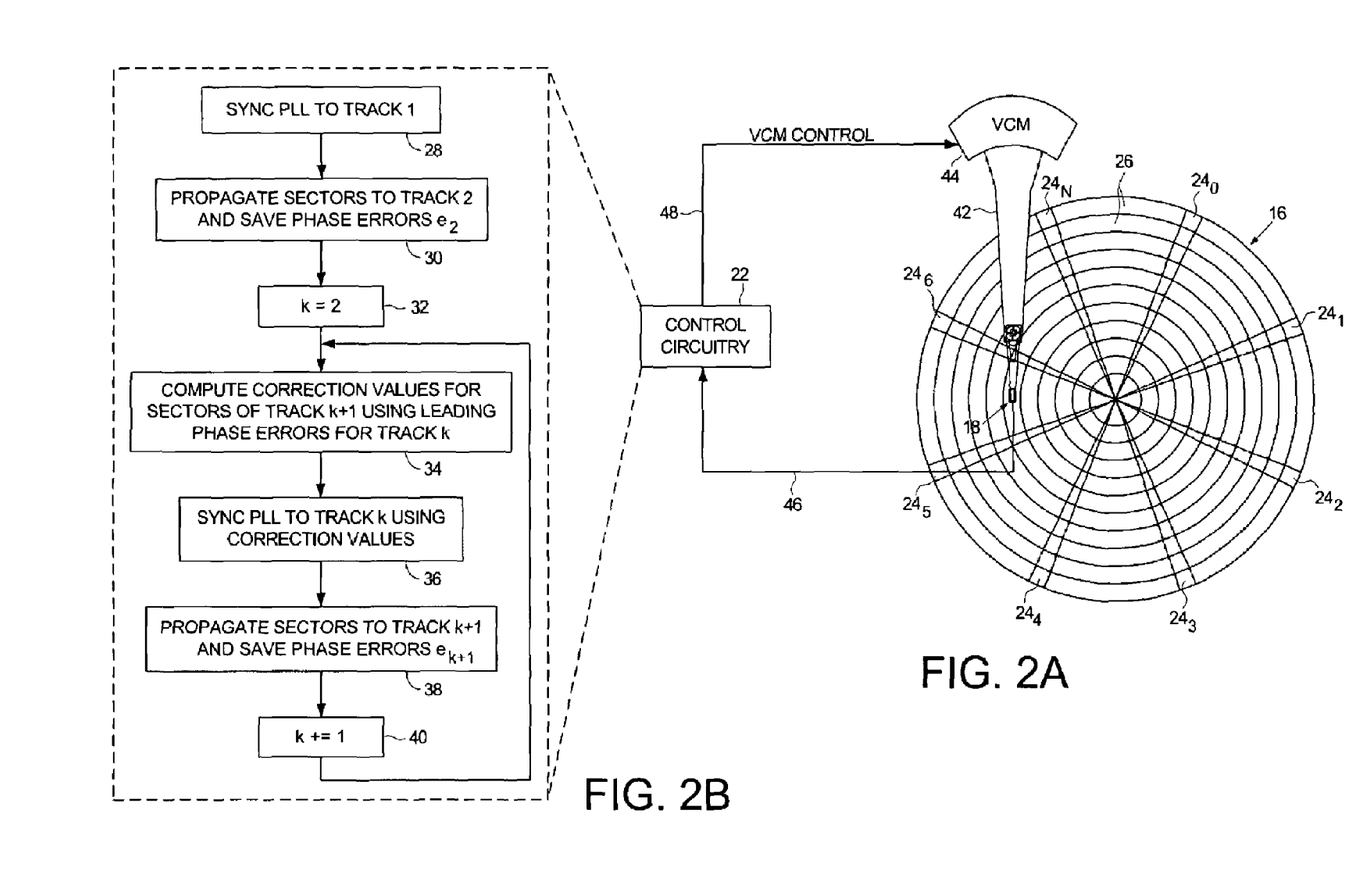
FIG. 2A shows a disk drive according to an embodiment of the present invention comprising control circuitry for servo writing the disk.
FIG. 2B is a flow diagram executed by the control circuitry to servo write the disk using correction values computed from phase errors generated for leading sectors.
Figure 3A:
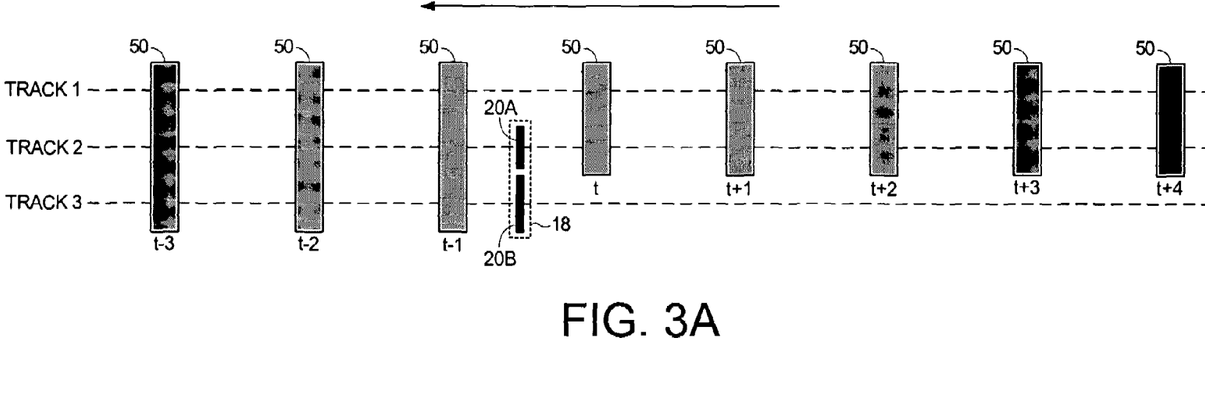
FIG. 3A illustrates the propagation of sectors during the servo writing process.

FIG. 2A shows a disk drive according to an embodiment of the present invention including a disk 16 and a head 18 actuated over the disk 16, wherein the head 18 comprises a read element 20A and a write element 20B (FIG. 3A). The disk drive further comprises control circuitry 22 for executing the flow diagram of FIG. 2B in order to write a plurality of servo sectors $24_0$-$24_N$ to define a plurality of tracks 26. The read element 20A is positioned over a first track on the disk 16 and the write element 20B is positioned over a second track on the disk 16. At step 28 a phase locked loop (PLL) is synchronized to first sectors previously written on the first track, and at step 30 second sectors are written to the second track using the PLL, wherein a plurality of phase errors corresponding to the second sectors are saved. At step 32 a track index k is initialized to two. At step 34 a correction value is computed corresponding to a selected one of the second sectors, wherein the correction value is computed in response to a plurality of the phase errors generated for a plurality of the second sectors leading the selected sector. At step 36, the read element 20A is positioned over the second track on the disk and the write element over a third track on the disk, and the PLL is synchronized to the second sectors using the correction value. At step 38 a third sector is written to the third track using the PLL, and a phase error is saved corresponding to the third sector. At step 40 the track index k is incremented and steps 34-40 are re-executed until the entire disk 16 has been servo written.

In the embodiment of FIG. 2A, the head 18 is connected to the distal end of an actuator arm 42 which is rotated about a pivot by a voice coil motor (VCM) 44 in order to actuate the head 18 radially over the disk 16. The control circuitry 22 processes the read signal 46 emanating from the head 18 to demodulate the position information recorded in the propagated sectors during the self servo writing operation (as well as the product servo sectors $24_0$-$24_N$ during normal operation). The control circuitry 22 generates a control signal 48 applied to the VCM 44 in response to the position information in order to maintain the head 18 over a target radial location.

Any suitable control circuitry 22 may be employed to implement the embodiments of the present invention. In one embodiment, the control circuitry 22 comprises a microprocessor executing instructions, the instructions being operable to cause the microprocessor to perform the steps of FIG. 2B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 16 and read into a volatile semiconductor memory when the disk drive is powered on. In yet another embodiment, the control circuitry 22 comprises suitable logic circuitry, such as state machine circuitry.

In one embodiment, the initial track (track 1) is written to the disk using an external servo writer or media writer. As illustrated in FIG. 3A, the initial track (track 1) comprises an initial plurality of sectors 50, wherein each sector 50 may comprise any suitable format. In one embodiment, each sector 50 comprises the same fields as a conventional servo sector 6 shown in FIG. 1, including a preamble 8 used to synchronize the PLL as well as servo bursts 14 for generating radial position information. In one embodiment, the propagated sectors 50 become the product servo sectors 24 (FIG. 2A) at the completion of the servo writing operation. In an alternative embodiment, an integer multiple of sectors 50 (e.g., twice as many product servo sectors 24) are propagated during the servo writing operation, wherein the extra sectors 50 are erased (or ignored) once the servo writing operation is complete. The extra sectors 50 provide additional timing and radial position information during the servo writing operation. In an alternative embodiment, at least one of the sectors 50 comprises only timing information for synchronizing the PLL.

While propagating the sectors 50, the read element 20A is positioned over a previously written servo track in order to read the previously written sectors 50 for servoing the head 18 as well as synchronize the PLL. In the example of FIG. 3A, the read element 20A is positioned over track 2 while propagating the sectors 50 to track 3. As described in more detail below, when writing sector t to track 3, the PLL is synchronized using a correction value that compensates for phase errors written into track 2. The correction value is computed in response to a plurality of the phase errors generated while writing the sectors 50 to track 2, including a plurality of the sectors 50 leading sector t (e.g., t+1, t+2,. etc.).

Figure 3B:
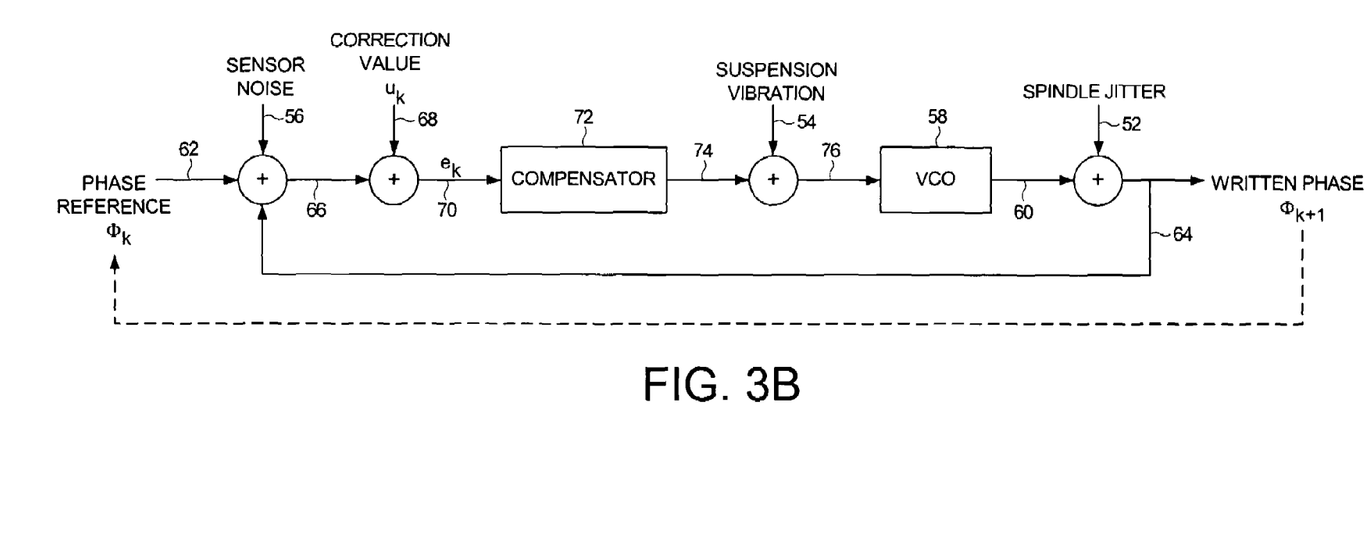
FIG. 3B shows elements of a phase locked loop (PLL) used to propagate the sectors using correction values that compensate for written-in phase errors of previously written servo tracks.

The PLL for servo writing the disk may comprise any suitable circuitry, and may be implemented in hardware or software, or a combination thereof. FIG. 3B shows an embodiment of the PLL including the disturbances due to spindle jitter 52, suspension vibration 54, and sensor noise 56. The PLL of FIG. 3B comprises a voltage controlled oscillator (VCO) 58 for generating a write clock 60 used to propagate the sectors 50 across the disk during the servo writing operation. The spindle jitter 52 adds phase error to the write clock 60 while writing the sectors $\Phi_{k+1}$ to the next track. The phase reference 62 for the PLL is generated by reading the sectors $\Phi_k$ from the previously written track. The process of reading the previously written sectors results in sensor noise 56 which is added to the phase reference 62. A difference between the resulting phase reference and output signal 64 of the PLL generates a phase error 66 which is adjusted by the correction value 68 to generate an adjusted phase error $e_k$ 70. The adjusted phase error $e_k$ 70 is filtered by a compensator 72 to generate a VCO control signal 74. The noise generated by the suspension vibration 54 is represented as a disturbance added to the VCO control signal 74 resulting in the actual control signal 76 applied to the VCO 58.

Denoting the transfer function of the VCO 58 as P and the transfer function of the compensator 72 as C, the sensitivity transfer function S is represented as:

$$S = \frac{1}{1+PC}$$

Figure 4:
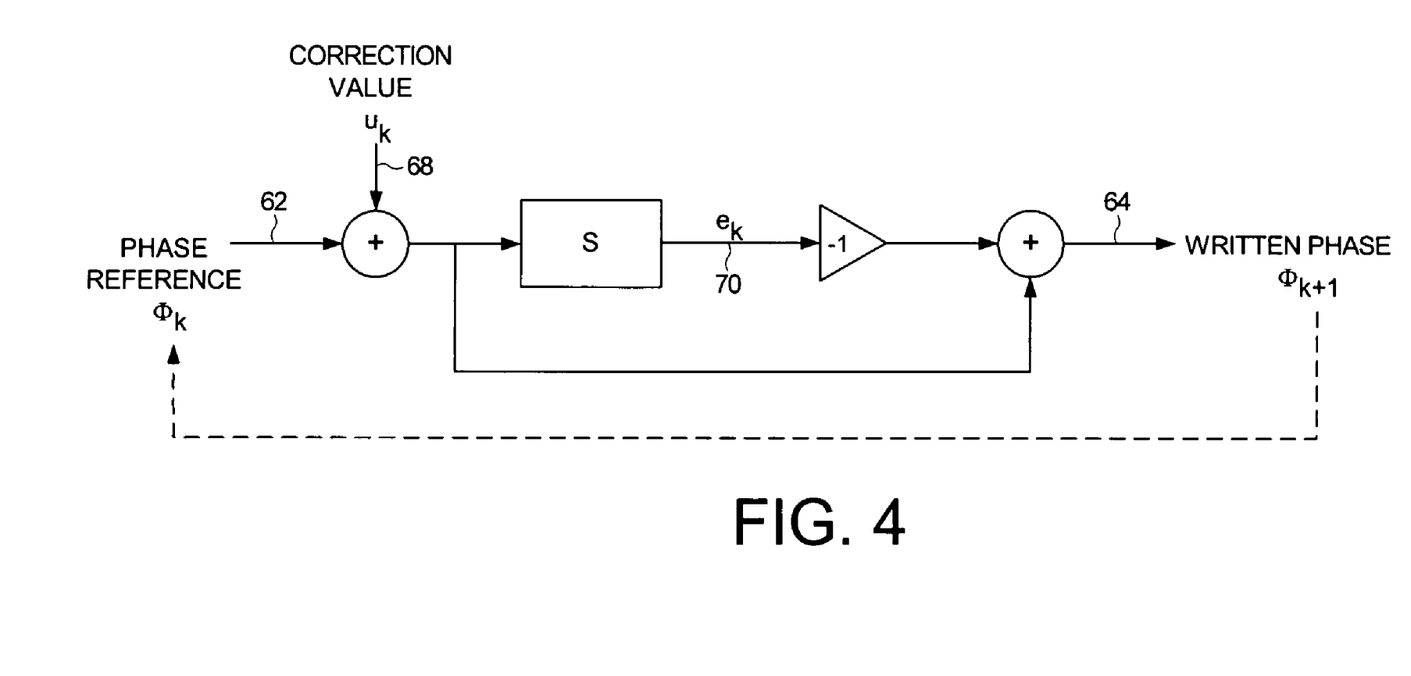
FIG. 4 shows an equivalent block diagram for the PLL of FIG. 3B.

The self-servo writing system can be represented equivalently as shown in FIG. 4, where the transfer function from $\Phi_k$ and $u_k$ to the next written track $\Phi_{k+1}$ is the closed loop transfer function (1−S), while the transfer function to the phase error $e_k$ is the sensitivity function S. The state space for sensitivity function S can be modeled as:

$$x_k(t+1) = Ax_k(t) + B\{u_k(t) + \Phi_k(t)\}$$

$$e_k(t) = Cx_k(t) + D\{U_k(t) + \Phi_k(t)\} \quad (1)$$

If the next track $\Phi k+1$ is written on the first revolution while servoing on track $\Phi_k$, then following the iterative learning control (ILC) method, this system may be represented over one revolution of the disk. Defining:

$$\Phi_k = \begin{bmatrix} \Phi_k(0) \\ \Phi_k(1) \\ M \\ \Phi_k(N-1) \end{bmatrix}; e_k = \begin{bmatrix} e_k(0) \\ e_k(1) \\ M \\ e_k(N-1) \end{bmatrix}; u_k = \begin{bmatrix} u_k(0) \\ u_k(1) \\ M \\ u_k(N-1) \end{bmatrix} \quad (2)$$

where N is the number of sectors in track k. The result is:

$$e_k = H_s(\Phi_k + u_k) + \Gamma_s x_k(0) \quad (3)$$

where:

$$H_s = \begin{bmatrix} D & 0 & K & 0 \\ CB & D & O & M \\ M & O & O & 0 \\ CA^{N-2} & L & CB & D \end{bmatrix}; \Gamma_s = \begin{bmatrix} C \\ CA \\ M \\ CA^{N-1} \end{bmatrix} \quad (4)$$

From FIG. 4:

$$\Phi_{k+1} = -e_k + \Phi_k + u_k \quad (5)$$

Substituting equation (3) into equation (5):

$$\Phi_{k+1} = (I-H_s)\Phi_k + (I-H_s)u_k - \Gamma_s x_k(0) \quad (6)$$

Choosing the correction signal $u_k$ as:

$$u_k = Ke_{k-1} \quad (7)$$

or equivalently:

$$u_{k+1} = Ke_k \quad (8)$$

Substituting for $e_k$:

$$u_{k+1} = K\{H_s(\Phi_k + u_k) + \Gamma_s x_k(0)\} \\ = KH_s\Phi_k + KH_s u_k + K\Gamma_s x_k(0) \quad (9)$$

Combining equation (6) and equation (8) the dynamics of the system can be represented as:

$$\begin{bmatrix} \Phi_{k+1} \\ u_{k+1} \end{bmatrix} = \begin{bmatrix} I-H_s & I-H_s \\ KH_s & KH_s \end{bmatrix} \begin{bmatrix} \Phi_k \\ u_k \end{bmatrix} + \begin{bmatrix} -\Gamma_s x_k(0) \\ K\Gamma_s x_k(0) \end{bmatrix} \quad (10)$$

To ensure stability while preventing phase error propagation the matrix K is chosen such that the matrix $$\begin{bmatrix} I-H_s & I-H_s \\ KH_s & KH_s \end{bmatrix} \quad (11)$$

is stable.

After seeking from the current track to the next track, it may be necessary to wait for one or more revolutions before commencing the servo track writing to allow the transients to decay. If so, the above equations need to be modified appropriately. For example, if the servo writing commences on the second revolution of the disk, then redefining equation (2) as:

$$\Phi_k = \begin{bmatrix} \Phi_k(N) \\ \Phi_k(N+1) \\ M \\ \Phi_k(2N-1) \end{bmatrix}; \quad e_k = \begin{bmatrix} e_k(N) \\ e_k(N+1) \\ M \\ e_k(2N-1) \end{bmatrix}; \quad u_k = \begin{bmatrix} u_k(N) \\ u_k(N+1) \\ M \\ u_k(2N-1) \end{bmatrix} \quad (12)$$

the dynamic model is represented as:

$$\begin{bmatrix} \Phi_{k+1} \\ u_{k+1} \end{bmatrix} = \begin{bmatrix} I-H_s & I-H_s \\ KH_s & KH_s \end{bmatrix} \begin{bmatrix} \Phi_k \\ u_k \end{bmatrix} + \begin{bmatrix} -\Gamma_s x_k(N) \\ K\Gamma_s x_k(N) \end{bmatrix} \quad (13)$$

where $x_k(N)$ is the state vector of the sensitivity function on the Nth sample. However, since $\Phi_k$ and $u_k$ are both repetitive signals, the values of $y_k$ and $u_k$ in equation (2) are the same as in equation (12) which means:

$$\begin{bmatrix} \Phi_k(0) \\ \Phi_k(1) \\ M \\ \Phi_k(N-1) \end{bmatrix} = \begin{bmatrix} \Phi_k(N) \\ \Phi_k(N+1) \\ M \\ \Phi_k(2N-1) \end{bmatrix}; \quad \begin{bmatrix} u_k(0) \\ u_k(1) \\ M \\ u_k(N-1) \end{bmatrix} = \begin{bmatrix} u_k(N) \\ u_k(N+1) \\ M \\ u_k(2N-1) \end{bmatrix} \quad (14)$$

However, the phase error $e_k$ defined by equation (12) is not the same as in equation (2). The value of the state of the sensitivity function S on the Nth sample of track following is related to the initial condition by:

$$x_k(N) = A^N x_k(0) + \lambda(\Phi_k + u_k) \quad (15)$$

where:

$$\lambda = [B \ AB \ L \ A^{N-1}B] \quad (16)$$

Substituting equation (15) into equation (13), the modified dynamics are:

$$\begin{bmatrix} \Phi_{k+1} \\ u_{k+1} \end{bmatrix} = \begin{bmatrix} I-H_s-\Gamma_s\lambda & I-H_s-\Gamma_s\lambda \\ KH_s+K\Gamma_s\lambda & KH_s+K\Gamma_s\lambda \end{bmatrix} \begin{bmatrix} \Phi_k \\ u_k \end{bmatrix} + \begin{bmatrix} -\Gamma_s x_k(0) \\ K\Gamma_s x_k(0) \end{bmatrix} \quad (17)$$

In this case, to prevent phase error propagation the matrix K should be selected such that the matrix $$\overline{A} = \begin{bmatrix} I-H_s-\Gamma_s\lambda & I-H_s-\Gamma_s\lambda \\ KH_s+K\Gamma_s\lambda & KH_s+K\Gamma_s\lambda \end{bmatrix} \quad (18)$$

is stable. For a typical PLL, the following Toeplitz matrix stabilizes the matrix $\overline{A}$ $$K = \begin{bmatrix} \alpha_0 & \alpha_1 & \alpha_2 & \alpha_3 & L & 0 \\ 0 & \alpha_0 & \alpha_1 & \alpha_2 & & O \\ 0 & 0 & \alpha_0 & \alpha_1 & & O \\ 0 & 0 & 0 & \alpha_0 & & O \\ M & M & O & O & & O \\ \alpha_1 & \alpha_2 & \alpha_3 & L & 0 & \alpha_0 \end{bmatrix} \quad (19)$$

The matrix K of equation (19) corresponds to the following correction values:

$$u_{k+1}(t) = \alpha_0 e_k(t) + \alpha_1 e_k(t+1) + \alpha_2 e_k(t+^2) + \alpha_3 e_k(t+^3) \quad (20)$$

The above equation means that the correction value for a sector t on track k+1 is generated in response to a plurality of the phase errors $e_k$ generated for a plurality of the sectors 50 leading the sector t on the previously servo written track k (see the above description of FIG. 3A). That is, the above equation is non-causal as compared to a conventional compensation filter determined using frequency domain analysis.

In one embodiment, the sectors 50 are propagated in an interleaved manner. For example, referring again to FIG. 3A the even numbered sectors 50 may be read while writing the odd numbered sectors 50 during a first revolution of the disk, and then the odd numbered sectors 50 may be read while writing the even numbered sectors 50 during a second revolution of the disk. In this embodiment, the sectors in the above equations represent consecutive even numbered sectors or consecutive odd numbered sectors.

We claim:

1. A method of servo writing a disk of a disk drive, the disk drive comprising the disk and a head actuated over the disk, the head comprising a read element and a write element, the method comprising:
   positioning the read element over a first track on the disk and the write element over a second track on the disk;
   synchronizing a phase locked loop (PLL) to first sectors previously written on the first track;
   writing second sectors to the second track using the PLL, and saving a plurality of phase errors corresponding to the second sectors;
   computing a correction value corresponding to a selected one of the second sectors, wherein the correction value is computed in response to a plurality of the phase errors generated for a plurality of the second sectors leading the selected sector;
   positioning the read element over the second track on the disk and the write element over a third track on the disk;
   synchronizing the PLL to the second sectors using the correction value; and
   writing a third sector to the third track using the PLL, and saving a phase error corresponding to the third sector.

2. The method as recited in claim 1, wherein the correction value is at least partially computed according to:

$\alpha \square e(t+m)$ where $\alpha$ is a constant and $e(t+m)$ is the phase error generated for one of the second sectors leading the selected sector by m sectors.

3. The method as recited in claim 1, wherein the correction value is at least partially computed according to:

$$\alpha_0 \Box e(t) + \alpha_1 \Box e(t+1) + \ldots \alpha_N \Box e(t+N)$$

where $\alpha$-$\alpha_N$ are a plurality of constants and $e(t+m)$ is the phase error generated for one of the second sectors leading the selected sector by m sectors.

4. The method as recited in claim 3, wherein the constants $\alpha$-$\alpha_N$ are selected to stabilize the PLL while attenuating phase error propagation from track-to-track.

5. A disk drive comprising:
(a) a disk;
(b) a head actuated over the disk, wherein the head comprises a read element and a write element; and
(c) control circuitry operable to servo write the disk by:
   positioning the read element over a first track on the disk and positioning the write element over a second track on the disk;
   synchronizing a phase locked loop (PLL) to first sectors previously written on the first track;
   writing second sectors to the second track using the PLL, and saving a plurality of phase errors corresponding to the second sectors;
   computing a correction value corresponding to a selected one of the second sectors, wherein the correction value is computed in response to a plurality of the phase errors generated for a plurality of the second sectors leading the selected sector;
   positioning the read element over the second track on the disk and the write element over a third track on the disk;
   synchronizing the PLL to the second sectors using the correction value; and
   writing a third sector to the third track using the PLL, and saving a phase error corresponding to the third sector.

6. The disk drive as recited in claim 5, wherein the correction value is at least partially computed according to:

$$\alpha \Box e(t+m)$$

where $\alpha$ is a constant and $e(t+m)$ is the phase error generated for one of the second sectors leading the selected sector by m sectors.

7. The disk drive as recited in claim 5, wherein the correction value is at least partially computed according to:

$$\alpha_0 \Box e(t) + \alpha_1 \Box e(t+1) + \ldots \alpha_N \Box e(t+N)$$

where $\alpha$-$\alpha_N$ are a plurality of constants and $e(t+m)$ is the phase error generated for one of the second sectors leading the selected sector by m sectors.

8. The disk drive as recited in claim 7, wherein the constants $\alpha$-$\alpha_N$ are selected to stabilize the PLL while attenuating phase error propagation from track-to-track.

9. Control circuitry for use in a disk drive, the disk drive comprising a disk and a head actuated over the disk, wherein the head comprises a read element and a write element, the control circuitry operable to servo write the disk by:
   positioning the read element over a first track on the disk and positioning the write element over a second track on the disk;
   synchronizing a phase locked loop (PLL) to first sectors previously written on the first track;
   writing second sectors to the second track using the PLL, and saving a plurality of phase errors corresponding to the second sectors;
   computing a correction value corresponding to a selected one of the second sectors, wherein the correction value is computed in response to a plurality of the phase errors generated for a plurality of the second sectors leading the selected sector;
   positioning the read element over the second track on the disk and the write element over a third track on the disk;
   synchronizing the PLL to the second sectors using the correction value; and
   writing a third sector to the third track using the PLL, and saving a phase error corresponding to the third sector.

10. The control circuitry as recited in claim 9, wherein the correction value is at least partially computed according to:

$$\alpha \Box e(t+m)$$

where $\alpha$ is a constant and $e(t+m)$ is the phase error generated for one of the second sectors leading the selected sector by m sectors.

11. The control circuitry as recited in claim 9, wherein the correction value is at least partially computed according to:

$$\alpha_0 \Box e(t) + \alpha_1 \Box e(t+1) + \ldots \alpha_N \Box e(t+N)$$

where $\alpha$-$\alpha_N$ are a plurality of constants and $e(t+m)$ is the phase error generated for one of the second sectors leading the selected sector by m sectors.

12. The control circuitry as recited in claim 11, wherein the constants $\alpha$-$\alpha_N$ are selected to stabilize the PLL while attenuating phase error propagation from track-to-track.

* * * * *